(12) United States Patent
Strapac et al.

(10) Patent No.: US 11,308,200 B1
(45) Date of Patent: Apr. 19, 2022

(54) RECALLABLE MEDIA PASSWORD GENERATOR

(71) Applicants: Apaporn Strapac, Sammamish, WA (US); Joshua Anthony Strapac, Sammamish, WA (US)

(72) Inventors: Apaporn Strapac, Sammamish, WA (US); Joshua Anthony Strapac, Sammamish, WA (US)

(*) Notice: Subject to any disclaimer, the term of this patent is extended or adjusted under 35 U.S.C. 154(b) by 0 days.

(21) Appl. No.: 17/120,183

(22) Filed: Dec. 13, 2020

(51) Int. Cl.
*G06F 21/46* (2013.01)
*G06F 21/36* (2013.01)
*G06F 3/01* (2006.01)
*G06F 3/04883* (2022.01)

(52) U.S. Cl.
CPC .............. *G06F 21/46* (2013.01); *G06F 3/013* (2013.01); *G06F 3/04883* (2013.01)

(58) Field of Classification Search
CPC ...... G06F 21/46; G06F 21/36; G06F 3/04883; G06F 3/017
See application file for complete search history.

(56) References Cited

U.S. PATENT DOCUMENTS

| | | | | |
|---|---|---|---|---|
| 2010/0325721 | A1* | 12/2010 | Bandyopadhyay ... | G06F 21/316 726/19 |
| 2014/0289870 | A1* | 9/2014 | Selander ................. | G06F 21/46 726/28 |
| 2015/0304303 | A1* | 10/2015 | Thibadeau, Sr. ..... | G06F 3/0482 726/5 |
| 2017/0160897 | A1* | 6/2017 | Chung .................... | G06F 21/31 |

* cited by examiner

*Primary Examiner* — Nhat Huy T Nguyen
(74) *Attorney, Agent, or Firm* — Walker Griffin Weitzel; Alloy Patent Law

(57) ABSTRACT

A method and apparatus for setting up a media keypad password for recalling a highly complex password is presented to solve the security problem of storing all passwords in password manager vaults due to the majority of human's inability to recall long passwords. The method for setting up a media keypad password for recalling a complex password includes users using their media source of choice as the media keypad; the users interacting with the media keypad; capturing sequence of inputs from the media keypad; capturing password setting, media data and media metadata; feeding the sequence of inputs from the media keypad along with password settings, media data and media metadata to a password generator algorithm; and displaying the password generated to the user.

20 Claims, 3 Drawing Sheets

RECALLABLE MEDIA PASSWORD GENERATOR

FIELD OF INVENTION

Various embodiments of the disclosure relate generally to secure access systems. More specifically, various embodiments of the disclosure relate, in particular, to a password generator for use in providing secure access to a controlled application.

BACKGROUND

Traditionally, passwords are stored physically or in memory on mediums like password manager, a piece of paper, or user's memory.

As the internet expands and more web applications enter the network, the number of accounts and password combination one needs to memorize has increased overtime.

Also, it has been observed that the computing power increases as new hardware are introduced into the market at lower cost, and accordingly passwords that are considered as being impossible to crack by brute force attacks in the past are now being made possible to crack overtime.

A simple safety measure against brute force attack is having a longer and complex password. This lowers your risk by increasing the time substantially required for someone to crack your password. For instance, a simple password with three alphabet characters i.e., choose 1 out of 26 for each letter 3 times will give you=26×26×26=17576 combinations. However, a strong password with eight alphanumeric characters i.e., choose 1 out of 36 for each letter or number 8 times will give you=36×36×36×36×36×36×36×36=2821109907456 combinations.

Though, there is a need for a longer password, but the challenge that we are faced with a longer and complex password is that it is more difficult to remember. An average human has a limit in terms of memory capacity and therefore, it is not feasible for them to remember all the complex passwords for all accounts.

One solution adopted to alleviate having to remember all accounts and passwords with accuracy is password manager vaults. With password managers, a user saves username, password, and additional information related to an account in the vault. The password manager in turn secures this sensitive information via a master password to access the vault and sometimes with additional security option to use biometric information such as the user fingerprint or two-factor or multi-factor authentication password.

However, if the master password is compromised, the user is at risk of getting all their credentials stolen because it is stored in the vault. Thus, in light of the foregoing, there exists a need for a technical and reliable solution that overcomes the above-mentioned problems, challenges, and short-comings, and provides a new and enhanced password protection system. More particularly, to address the security concerns around master password issues and password vaults, the present invention discloses a mechanism to recall long passwords in the vault rather than storing passwords in the vault. Thus, even if the master password is compromised, the users' passwords cannot be stolen.

SUMMARY

In this section, we describe the solution to recall passwords by using media data (from sources such as picture or video or audio, or any combination thereof), media metadata, a sequence of inputs and password settings etc.

A user selects a picture that the user wants to use as the media keypad. A keypad cell grid of size n×m where n and m are positive integers and n, m may be equal or not equal to each other will be logically lay on top of the image. Examples of the cell grid type may include a tile grid, a triangle grid, or a hexagon grid.

The user may also select a video of choice that the user wants to use as the media keypad. A keypad cell grid of size n×m where n and m are positive integers and n, m may be equal or not equal to each other will be logically lay on top of the video. In some other embodiments, the user may also select an audio of choice that the user wants to use as the media keypad. A keypad cell grid of size n×m, where n and m are positive integers and n, m may be equal or not equal to each other will be logically lay on top of the audio.

Using the picture media keypad as an example, the concept is such that, each cell on the keypad may have a unique representation assigned to it. This unique representation may be in any form, but are not limited to, character codes or unique symbols. For example, a grid size of 3×3=9 cells, each cell may have a unique representation of, #1, #2, #3, #4, #5, #6, #7, #8 and #9, another combination may be #A, #B, #C, #D, #E, #F, #G, #H, and #I.

Each cell of the picture media keypad is associated with a subset image of the user's picture of choice, where each subset image has digital bits associated with it. Given this setup, a subset image with digital bits may be assigned to a unique representation on the keypad.

For example, given an image with the following digital bits representation (1A)(2B)(3C)(4D)(5E)(6F)(7G)(8H)(9I). Suppose we applied cell grid 3×3 to this image logically. We would have the following image digital bits subset (1A), (2B), (3C), (4D), (5E), (6F), (7G), (8H) and (9I). On top of this, we then defined the unique representation to be #1, #2, #3, #4, #5, #6, #7, #8 and #9. Next, we will assign a subset of image digital bits to a unique representation on the keypad, one possible combination may be #1—(1A), #2—(2B), #3—(3C), #4—(4D), #5—(5E), #6—(6F), #7—(7G), #8—(8H) and #9—(9I).

The concept, as described above, applies to a video media keypad as well in a similar manner Each cell of the video media keypad is associated with a subset video media data. Given this setup, we can assign a subset of video digital bits to a unique representation on the keypad. In some other embodiments, the concept, as described above, may also apply to an audio media keypad as well in a similar manner Each cell of the audio media keypad is associated with a subset audio media data. Given this setup, we can assign a subset of audio digital bits to a unique representation on the keypad.

The user will have the option to interact with the media keypad keys to select the appropriate choice of input via keyboard, touch screen, on-screen click, and voice. The user may also be capable of interacting with the user's choice of device based on one or more gestures provided by the user via eye or finger movements. The movements or gestures are detectable by means of one or more sensors including at least one or more motion tracking sensors, heat sensors, inertial sensors, magnetic sensors, gyro sensors, electromyography, or force-sensitive resistors. The sequence of inputs may then be temporarily captured, the storage medium for this can be on the device itself. Once the user is done selecting the sequence of inputs, the user may have the option to "generate" the password.

The user may have the ability to configure the length of password to be generated and the choice of character symbols that may be included. For ease of use, the invention will provide limited options of their choice of character symbols that the user may select.

Triggering the "generate" password option may send 1) the sequence of inputs as captured from the keypads key along with 2) the associated subset media data and 3) the password configuration (e.g., password length and the choice of character symbols) as input to the password generator algorithm. Once the password is generated by the algorithm, the password may then be displayed on the user's device. Optionally, the user may have the ability to copy the password to the clipboard or in memory for convenience use such as for login to an account.

Any password generator algorithm of choice that satisfies the following criteria can be used: 1) Given the same set of inputs, the algorithm will generate the exact same password. 2) At a minimum, the algorithm must take into consideration when generating the password, the sequence of inputs as captured from the media keypad along with the associated media data such as a subset of an image digital bits or a subset of video digital bits. 3) The algorithm may use the sequence of inputs and/or the associated subset media data as starters to recreate different combinations of inputs into the algorithm.

Any exchange of information across the network must be encrypted using secured transportation channels such as HTTPS and/or standard encryption like AES.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

The invention is explained in further detail, and by way of example, with reference to the accompanying drawings wherein.

Figure 1:
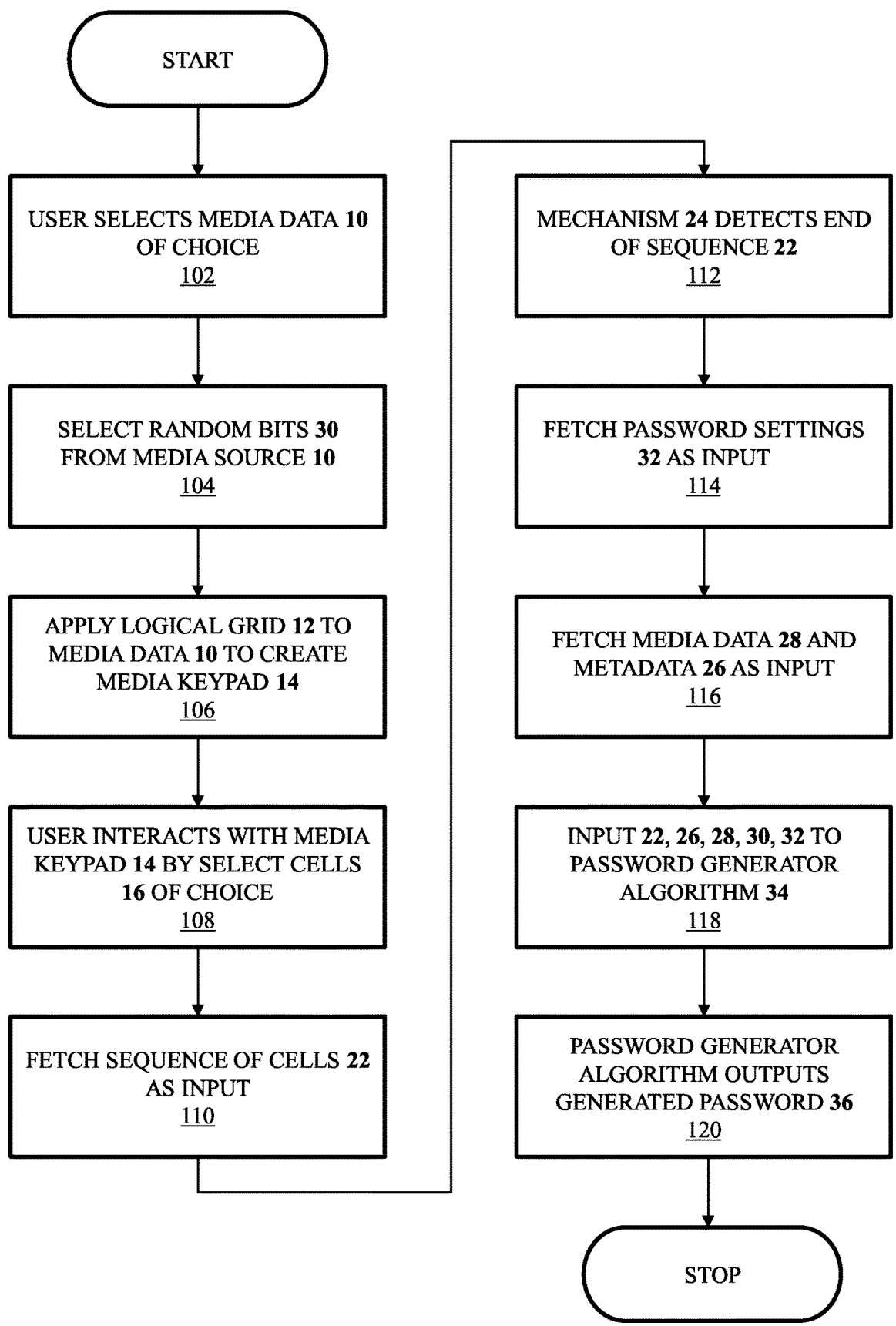
FIG. 1 shows the workflow diagram showing the process to recall passwords, in accordance with an exemplary embodiment of the disclosure.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in an embodiment" or "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. In addition, as used herein, the term "or" is an inclusive "or" operator and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" may include singular or plural references. The meaning of "in" includes "in" and "on."

The following is a description of illustrative embodiments that when taken in conjunction with the following drawings will demonstrate the above noted features and advantages, as well as further ones. In the description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well-known devices, tools, techniques, and methods are omitted so as not to obscure the description of the present system. It should be expressly understood that the drawings are included for illustrative purposes and do not represent the scope of the present system. In the accompanying drawings, like reference numbers in different drawings may designate similar elements.

As employed herein, the term "physical memory" may refer to a form of permanent storage.

As employed herein, the term "digital media" 10 may refer to any media that is encoded in a digital format.

As employed herein, the term "media data" 28 may refer to the digital representation of a digital media 10.

As employed herein, the term "media metadata" 26 may refer to the digital representation describing digital media 10.

As employed herein, the term "media cell data" 18 may refer to the subset of digital representation of "media data" 28 that is associated with media cell 16.

As employed herein, the term "media cell metadata" 20 may refer to the digital representation describing media cell data 18 that is associated with media cell 16.

As employed herein, the term "media cell" 16 may refer to the representation of media cell data 18 and media cell metadata 20. Each media cell 16 has a unique representation assigned to it.

As employed herein, the term "media keypad grid" 12 may refer to a collection of cells 16, containing media cell data and media cell metadata.

As employed herein, the term "media keypad" 14 may refer to digital media 10 with "media keypad grid" 12.

As employed herein, the term "media source random bits" 30 may refer to a collection of random digital bits as derived from media data 28.

As employed herein, the term "password setting" 32 may refer to the metadata that represents the user's password configuration for the media keypad 14.

As employed herein, the term "password generator algorithm" 34 may refer to an algorithm that performs logical manipulation of data based on its inputs and generates media keypad generated data 36 as output.

As employed herein, the term "media keypad generated data" 36 may refer to the output data as generated by password generator algorithm 34.

Referring now to FIG. 1, the reference numeral 10 shows a picture of a digital media of the user's choice. This media source can be a picture, video, or audio taken from the user's device such as a mobile device, or a picture, video, or audio file saved on the user's device, or a picture, video, or audio file saved on a remote server such as a database. In some embodiments, the media content may be a combination of one or more pictures, audios, and videos.

The digital media 10 has three representations, including a thumbnail, a medium size version, and data from the original media. A thumbnail is the smaller size (in dimensions and resolution) of the digital media 10, optimized for use for gallery displaying purpose. A medium size media version is the medium size (in dimensions and resolution) of the digital media 10, optimized for single image display on the user's device. The data from the original media comes from the digital media 10 in its original size and resolution format.

The digital media 10 has the media data 28 and the media metadata 24 associated with it. Example of the media data 28 is the digital bits that form the digital media 10. Examples of the media metadata 24 include a timestamp of when the image or video or audio is created or captured, or a hash code of the image or video or audio.

The media keypad grid 12 contains a collection of cells 16. The size of the grid 12 is n×m, where n and m are positive integers and n, m may be equal or not equal to each other. Examples of the cell grid type may include a tile grid, a triangle grid, or a hexagon grid.

Each cell 16 has a unique representation assigned to it. This unique representation may be in any form, not limited to character codes or unique symbols. For example, a grid size of n×m where n=3 and m=3 will have 9 cells (shown by the reference numeral 16) with each cell having a unique representation of, #1, #2, #3, #4, #5, #6, #7, #8 and #9. The user can use this unique representation to distinguish which cell they choose to interact with.

Each cell 16, may also have the media cell data 18 and the media cell metadata 26 associated with it. Examples of this media cell data 18 are the bits of cell 16 comprising a subset media data 28. Examples of the media cell metadata 26 include a timestamp of when the media is created or the hash code of the subset of the image etc.

The digital media 10 with the media keypad grid 12 becomes the media keypad 14. The media keypad 14 is to be displayed on a user's choice of device that allows them to view and interact with the media keypad 14. Each cell 16 represents a unique touch point that the user can select.

Through the media keypad 14, the user can select a sequence of unique representation 22 via the touch points cell 16. The mechanism for accepting inputs from the media keypad 14 can be aided using additional tools or approaches such as, and not limited to, keyboard, touch screen, on-screen click and/or voice. The user may also be capable of interacting with the user's choice of device based on one or more gestures provided by the user via eye or finger movements. The movements or gestures are detectable by means of one or more sensors including at least one or more motion tracking sensors, heat sensors, inertial sensors, magnetic sensors, gyro sensors, electromyography, or force-sensitive resistors. Any form of input capturing mechanism that allows the user to input multiple unique key representations in sequence may be applicable.

This sequence of unique representation 22 may then be stored temporarily on the user's choice of device for displaying the media keypad 14.

There are media source random bits 30 that is a collection of random digital bits as derived from the media data 28 that will be stored temporarily on the user's choice of device.

There are password settings 32 that represents the user's password configuration for the media keypad password generation 14. The password settings 32 may have any information such as, but is not limited to, the length of password to be generated or the choice of character symbols that may be included. It is recommended that the password settings 32 be stored in a physical memory device such that the user's choice of device for displaying the media keypad 14 or in database on a network with mechanisms for the user to retrieve the password setting 32 across the network via the user's choice of device for displaying the media keypad 14.

There is mechanism 24 for making a determination of the end of the sequence of unique representation 22. The mechanism 24 may be implemented in several forms, but are not limited to, 1) via user initiation such as a visible object on the user's choice of device where the user can interact with after the user is done inputting the sequence of the unique representation 22 or 2) via system initiation such as an automated background process that gets triggered after x duration of time has passed counting from the last moment cell 16 is selected.

Once the mechanism 24 has been triggered, the embodiments may fetch the media source random bits 30, the media data 28, the password settings 32 information along with the sequence of unique representation 22 as inputs for the password generator algorithm 34.

The password generator algorithm 34 may perform logical manipulation of data based on the inputs and generates the media keypad generated data 36 as output. An example of the media keypad generated data 36 is a string of generated password.

The implementation of the password generator algorithm 32 must conform to the following constraints: given exactly the same inputs to 28, it must generate the exact same output of media keypad generated data 30.

Figure 2:
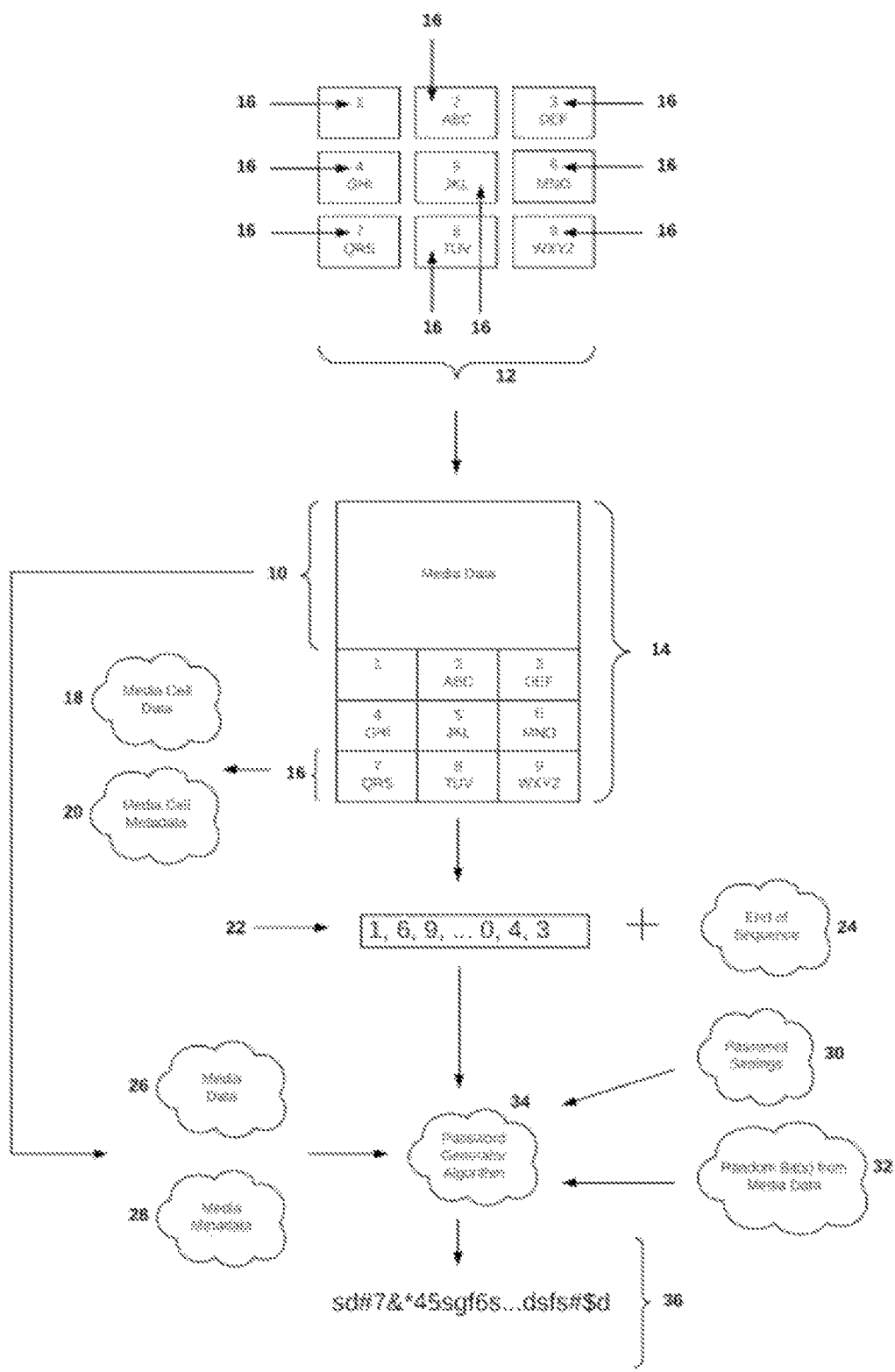
FIG. 2 shows the diagram of the password recall mechanism, in accordance with an exemplary embodiment of the disclosure.

FIG. 2 shows the diagram of the password recall mechanism, in accordance with an exemplary embodiment of the disclosure. The password recall mechanism has been described above in conjunction with FIG. 1. For example, in FIG. 1, at step 102, the user selects the media data 10 of choice. Further, at step 104, the random bits 30 may be selected from the media source 10. Further, at step 106, the logical grid 12 may be applied to the media data 10 to create the media keypad 14. Further, at step 108, the user interacts with the media keypad 14 by selecting the cells 16 of choice. Further, at step 110, the sequence of cells 22 may be fetched as input. Further, at step 112, the mechanism 24 detects end of sequence 22. Further, at step 114, the password settings 32 are fetched as input. Further, at step 116, the media data 28 and the metadata 26 are fetched as input. Further, at step 118, input 22, 26, 28, 30, 32 to password generator algorithm 34. Further, at step 120, password generator algorithm outputs the generated password 36.

The application domain of this embodiment is not limited to password managers. The embodiments may be used with a password manager as well. The embodiments may be used as a media keypad in combination with personal identification number (PIN) and two-factor or multi-factor authentication to login without the requirement of typing in or knowing a long complex password. The user can select one media then enter a sequence then choose another media and do another sequence and it would act as one transaction making it very difficult to know the algorithms output for a complex long password. A way to not expose the true password in the system.

Figure 3:
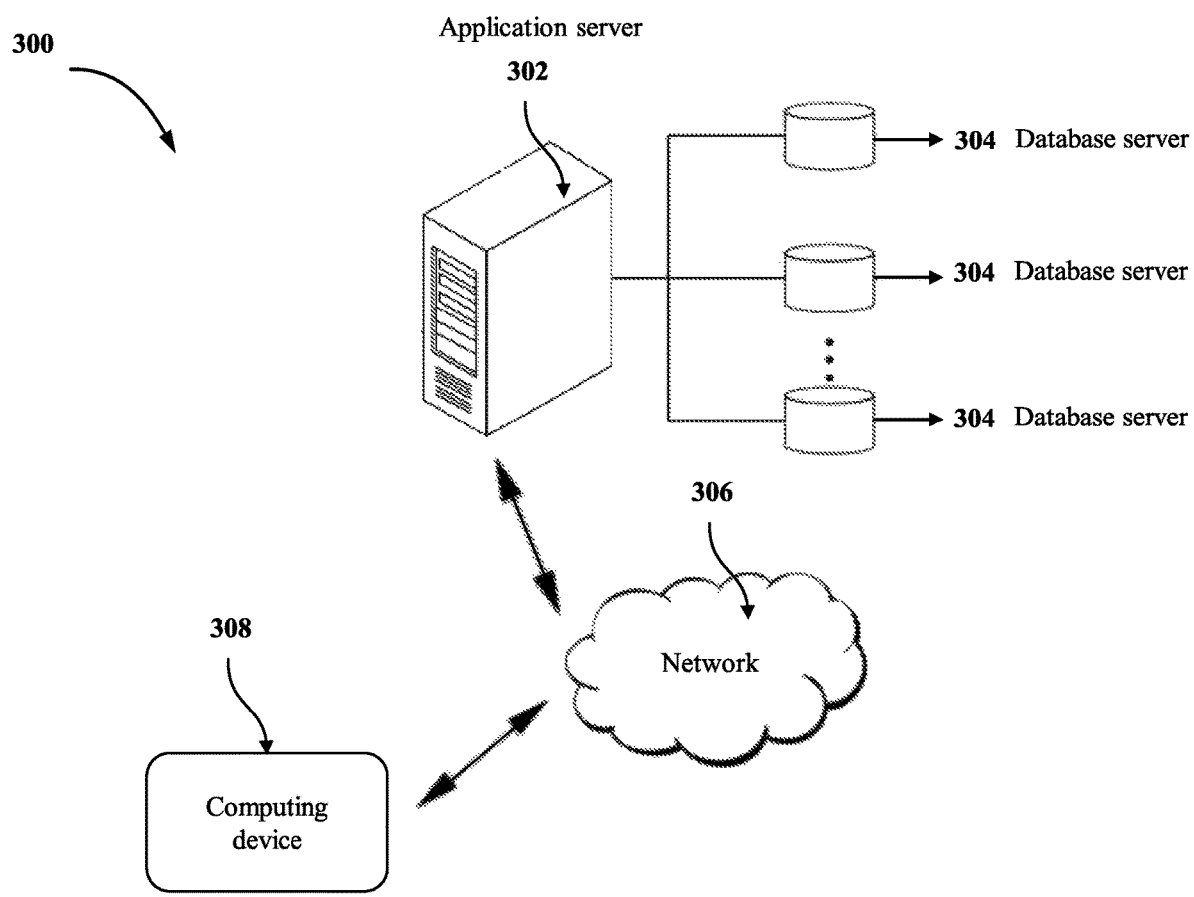
FIG. 3 is a block diagram that illustrates a system environment in which various operations of password generation are practiced, in accordance with an exemplary embodiment of the disclosure.

The embodiments can be used as a password generator (that can be implemented and executed by an application server, as discussed in FIG. 3) to create complex long passwords.

For security reasons, this implementation of this embodiments should require a form of authentication using the standard market mention of authentication such as a master password and/or two/multi factor authentication to secure the media keypad.

The advantage of having these embodiments as the core engine over traditional password manager is that, instead of storing password directly on the device, we only store the digital media. Thus, if the master password is compromised, the hacker will not be able to retrieve any password from the device.

FIG. 3 is a block diagram that illustrates a system environment 300 in which various operations of the password generation are practiced, in accordance with an exemplary embodiment of the disclosure. The system environment 300 includes one or more computing servers such as an application server 302, one or more database servers such as a database server 304, and one or more networks such as a network 306. The system environment 300 further includes one or more user computing devices associated with one or more users such as a user computing device 308 associated with the user. Examples of the user computing device 308 may include a smartphone, a tablet computer, a laptop, or any other portable communication device. The application server 302 and the user computing device 308 may communicate with each other over a communication network such as the network 306. The application server 302 and the database server 304 may also communicate with each other over the same network 306 or a different network.

The application server 302 is a computing device, a software framework, or a combination thereof, that may provide a generalized approach to create the application server implementation. Examples of the application server 302 include, but are not limited to, a personal computer, a laptop, or a network of computer systems. The application server 302 may be realized through various web-based technologies such as, but not limited to, a Java web-framework, a .NET framework, a PHP (Hypertext Preprocessor) framework, or any other web-application framework. The application server 302 may operate on one or more operating systems such as Windows, Android, Unix, Ubuntu, Mac OS, or the like. Various operations of the application server 302 may be dedicated to execution of procedures, such as, but are not limited to, programs, routines, or scripts stored in one or more memory units for supporting its applied applications and performing one or more operations.

In an embodiment, the application server 302 may be configured to facilitate the generation of one or more passwords. The password generating platform may be implemented, supported, and presented by the application server 302 on the one or more user computing devices such as the user computing device 308 and may be used by the one or more users for performing the activities over the Internet. In an exemplary embodiment, the application server 302 may be configured to execute a computer program (corresponding to password generating algorithm) to implement one or more aspects of the password generation. For example, the computer program may create and manage databases and data tables that store data used by the computer program. The computer program may include instructions for the application server 302 to execute in order to implement the methods and processes associated with various aspects of the present disclosure. The computer program may be tangibly embodied on a computer readable medium such as a magnetic disk, a magneto-optical disk, a flash memory, a random-access memory, a read only memory, a programmable read only memory, an erasable programmable read only memory, or the like. The computer program further permits each network user to create one or more passwords.

In an exemplary embodiment, the application server 302 may be configured to receive a digital media of the user's choice. The application server 302 may be further configured to logically overlay the digital media. Each cell of the grid is an input touch point. The application server 302 may be further configured to enable the user to interact with the grid to input a sequence of touch points. The application server 302 may be further configured to capture data of digital media per cell, as segmented by the grid. The application server 302 may be further configured to capture and temporarily store the sequence of input touch points. The application server 302 may be further configured to capture and store one or more password settings based on choice of characters and length of password to be generated. The application server 302 may be further configured to generate a sequence of characters for a password based on the sequence of the user's selection of touch points and the data of digital picture per cell of the selected sequence as input, and the password settings. The application server 302 may be further configured to generating the recallable same sequence of characters for the password when given the same input and the identical set of input touch points.

The database server 304 may include suitable logic, circuitry, interfaces, and/or code, executable by the circuitry that may be configured to perform one or more data management and storage operations such as receiving, storing, processing, and transmitting queries, data, content, algorithms, code, or the like. In an embodiment, the database server 304 may be a data management and storage computing device that is communicatively coupled to the application server 302 or the user computing device 308 via the network 306 to perform the one or more operations. In an exemplary embodiment, the database server 304 may be configured to manage and store one or more profiles of the one or more users. Each profile may include information such as a user's name, number, email, preferences, followers, followings, or the like. In an exemplary embodiment, the database server 304 may be further configured to manage and store one or more images or videos or audios. In an exemplary embodiment, the database server 304 may be further configured to manage and store one or more algorithms, rules, code, or the like that are retrieved and executed by the application server 302 to perform the one or more designated operations in the real time. In an exemplary embodiment, the database server 304 may be further configured to manage and store one or more notifications. In an embodiment, the database server 304 may be further configured to receive a query from the application server 302 for retrieval of the stored information. Based on the received query, the database server 304 may communicate the requested information to the application server 302. The database server 304 may be implemented by means of a personal computer, a laptop, or a network of computer systems. Examples of the database server 304 may include, but are not limited to, MongoDB, Cassandra, and HBase, or Structured Query Language (SQL) database.

The network 306 may include suitable logic, circuitry, interfaces, and/or code, executable by the circuitry that may be configured to transmit messages and requests between various entities, such as the application server 302, the database server 304, and the user computing device 308. Examples of the network 306 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 300 may connect to the network 306 in accordance with various wired and wireless communication protocols, such as Transmission Control Protocol and Internet Protocol (TCP/IP), User Datagram Protocol (UDP), Long Term Evolution (LTE) communication protocols, or any combination thereof.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, a password generator for use in providing secure access to a controlled application. While various exemplary embodiments of the disclosed application have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for generating a recallable password using a digital media with user's inputs, the method comprising:
   receiving a digital media of the user's choice, wherein the digital media corresponds to at least one of a video or audio, wherein the digital media comprises media data and media metadata, wherein the media data includes digital bits that forms the digital media, and wherein the media metadata includes a timestamp of when the video or audio is created or captured, or a hash code of the video or audio;
   a grid that logically overlays the digital media, wherein the grid contains a collection of cells, and wherein each cell of the grid is an input touch point;
   enabling the user to interact with the grid to input a sequence of touch points;
   capturing data of the digital media per cell, as segmented by the grid;
   capturing and temporarily storing the sequence of input touch points;
   capturing and storing one or more password settings based on choice of characters and length of a password to be generated;
   generating a sequence of characters for the password based on the sequence of the user's selection of the touch points, the digital bits and the media metadata per cell of the selected sequence as input, and the password settings; and
   generating the recallable same sequence of characters for the password when given the same input and the identical set of input touch points.

2. The method of claim 1, wherein a source of the digital media includes the user's device or a remote server such as a database.

3. The method of claim 1, wherein any related data is to be displayed on the user's choice of device.

4. The method of claim 3, wherein the user's choice of device is capable of displaying the related data including at least the digital media of the user's choice along with the grid that logically overlays the digital media.

5. The method of claim 4, wherein the user is capable of interacting with the user's choice of device by means of keyboard, touch screen, on-screen click, voice, or any combination thereof.

6. The method of claim 4, wherein the user is capable of interacting with the user's choice of device based on one or more gestures provided via eye or finger movements, wherein the movements are detectable by means of one or more sensors including at least one or more motion tracking sensors, heat sensors, inertial sensors, magnetic sensors, gyro sensors, electromyography, or force-sensitive resistors.

7. The method of claim 4, wherein the user's choice of device is provided with enough capacity to support hosting of the method.

8. The method of claim 4, wherein the user's choice of device corresponds to a mobile or a personal computer, or an IoT device, or a raspberry pi microcontroller, or an Arduino.

9. The method of claim 1, wherein a mechanism to generate a string of alphanumeric characters comprises the captured inputs.

10. The method of claim 9, wherein the mechanism further comprises another mechanism that is executed for generating the same string of alphanumeric characters given the same set of inputs to a computer program.

11. The method of claim 1, wherein the generated password is secured.

12. The method of claim 1, wherein each cell has a unique representation in the form of unique characters or unique codes, wherein the user can use this unique representation to distinguish which cell the user choose to interact with.

13. The method of claim 1, wherein a cell type grid includes a triangle grid or a hexagon grid.

14. The method of claim 1, wherein a cell type grid includes a tile grid.

15. The method of claim 1, wherein any exchange of information across a network is encrypted using secured transportation channels such as HTTPS and/or standard encryption like AES.

16. A system to generate a recallable password using a digital media with user's inputs, the system comprising: circuitry configured to:
- receive a digital media of the user's choice, wherein the digital media corresponds to at least one of a video or audio;
- logically overlay the digital media by using a grid, wherein the grid contains a collection of cells, wherein each cell of the grid is an input touch point, wherein the digital media comprises media data and media metadata, wherein the media data includes digital bits that forms digital media, and wherein the media metadata includes a timestamp of when the video or audio is created or captured, or a hash code of the video or audio;
- enable the user to interact with the grid to input a sequence of touch points;
- capture data of the digital media per cell, as segmented by the grid;
- capture and temporarily store the sequence of input touch points;
- capture and store one or more password settings based on choice of characters and length of a password to be generated;
- generate a sequence of characters for the password based on the sequence of the user's selection of the touch points, the digital bits and the media metadata per cell of the selected sequence as input, and the password settings; and
- generate the recallable same sequence of characters for the password when given the same input and the identical set of input touch points.

17. The system of claim 16, wherein a source of the digital media includes the user's device or a remote server such as a database.

18. The system of claim 16, wherein the user is capable of interacting with the user's choice of device by means of keyboard, touch screen, on-screen click, voice, or any combination thereof.

19. The system of claim 16, wherein the user is capable of interacting with the user's choice of device based on one or more gestures provided via eye or finger movements, wherein the movements are detectable by means of one or more sensors including at least one or more motion tracking sensors, heat sensors, inertial sensors, magnetic sensors, gyro sensors, electromyography, or force-sensitive resistors.

20. The system of claim 16, wherein each cell has a unique representation in the form of unique characters or unique codes, wherein the user can use this unique representation to distinguish which cell the user choose to interact with.

* * * * *